Figure 1:
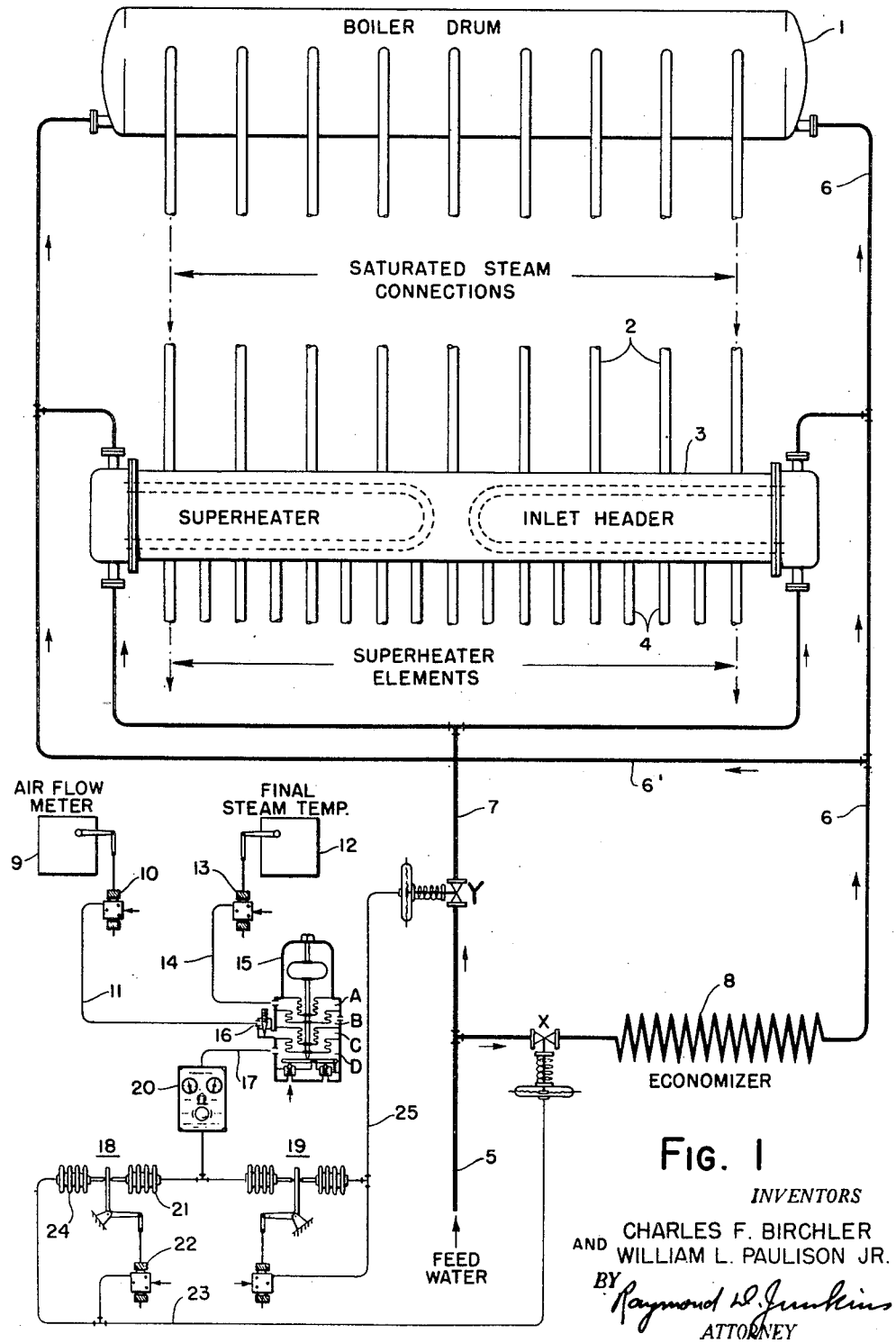

Oct. 24, 1950 C. F. BIRCHLER ET AL 2,526,843
TEMPERATURE CONTROL SYSTEM
Filed Sept. 19, 1947 3 Sheets-Sheet 1

INVENTORS
CHARLES F. BIRCHLER
AND WILLIAM L. PAULISON JR.
BY Raymond D. Junkins
ATTORNEY Oct. 24, 1950     C. F. BIRCHLER ET AL     2,526,843
TEMPERATURE CONTROL SYSTEM
Filed Sept. 19, 1947     3 Sheets-Sheet 2

INVENTORS
CHARLES F. BIRCHLER
AND WILLIAM L. PAULISON JR.
BY Raymond D. Jenkins
ATTORNEY

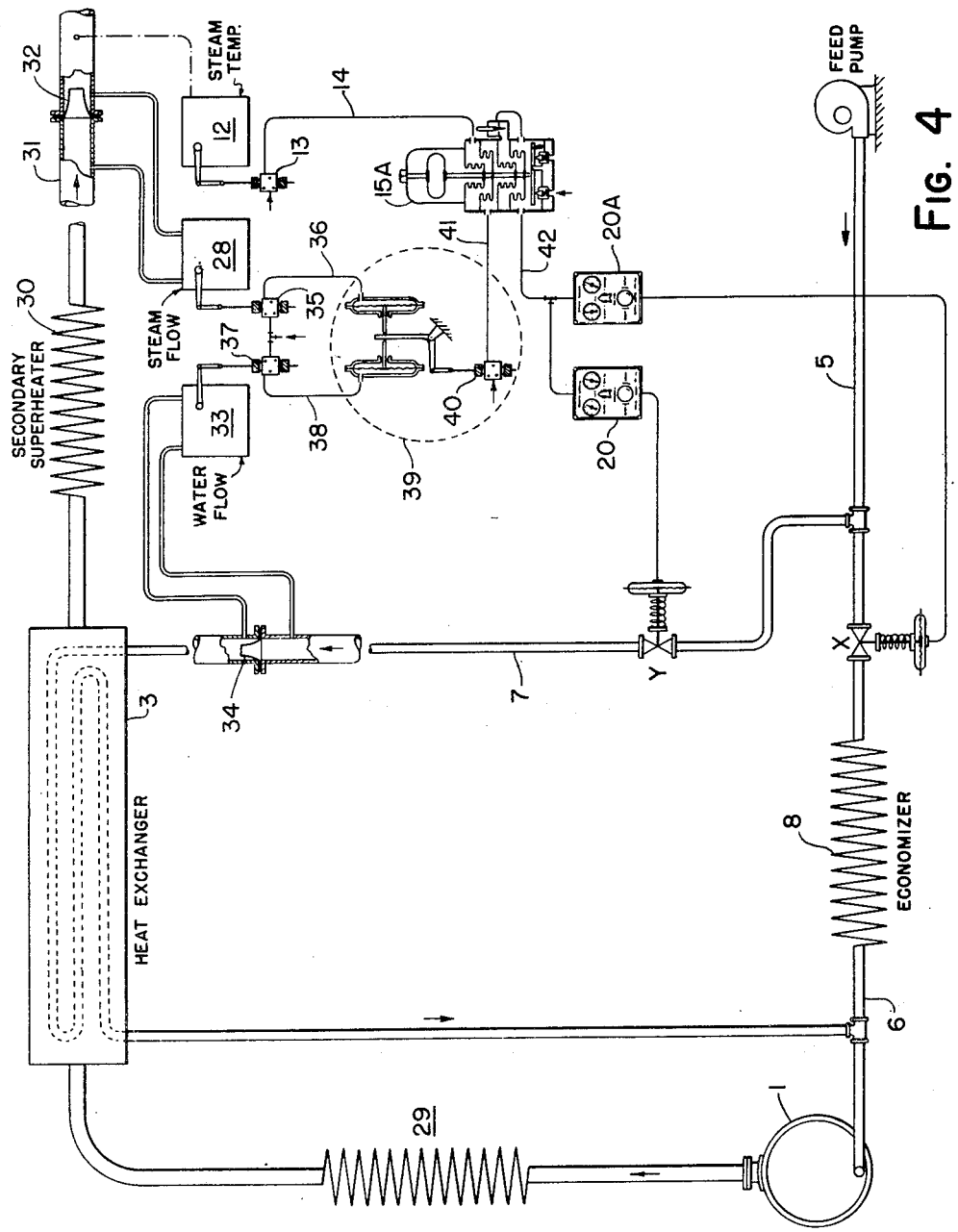

Patented Oct. 24, 1950

2,526,843

UNITED STATES PATENT OFFICE 2,526,843

TEMPERATURE CONTROL SYSTEM

Charles F. Birchler, East Cleveland, Ohio, and William L. Paulison, Jr., Ridgewood, N. J., assignors to Bailey Meter Company, a corporation of Delaware Application September 19, 1947, Serial No. 775,062

14 Claims. (Cl. 122—479)

1

Our invention relates broadly to heat exchange apparatus for regulating the final temperature of vapors or gases.

More specifically the invention relates to the control of an indirect heat exchanger located in the path of the flow of steam generated by a vapor generator for maintaining the final temperature of superheated steam leaving the unit within desired temperature limits. It will be evident that our invention may be adapted to other arrangements of power producing or utilizing apparatus and that we have merely chosen by way of example to illustrate and describe certain preferred embodiments.

A preferred form of our invention is herein exemplified by a control of the rate of supply of water to a condenser type indirect heat exchanger constituting the inlet header of a superheater which is supplied with steam from the separation drum of a vapor generator. Another embodiment discloses a control of the supply of cooling water to a heat exchanger located between a primary and a secondary superheater in the flow path of steam from a separator drum of the vapor generator. In either embodiment the heat exchanger serves the purpose of regulating the final temperature of the steam leaving the unit to maintain it within desired limits.

A principal object of the invention lies in the control of the rate of water supplied to the heat exchanger in accordance with one or more selected variables in the operation of the unit to the end that the final temperature of the steam will be maintained within certain limits.

Another object is to control the heat exchanger in such a manner that the steam produced by the unit will be within the desired limits of total temperature at different rates of output.

Another object is to control the heat exchanger in accordance with load demand as well as to correct for departure of the produced steam from desired condition.

A further object is to control the heat exchanger responsive to an indication of demand as well as responsive to an indication of one or more variable conditions of the steam.

Another object is to provide method and apparatus for controlling the supply of water to a heat exchanger responsive to rate of unit operation as well as to correct for tendencies of the produced steam to depart from desired final temperature.

Further objects will be evident from a study of the drawings and of the description thereof, the examples being preferred embodiments of our invention.

In the drawings:

Fig. 1 is a diagrammatic view of the control system for a heat exchanger in a system for producing controlled temperature superheated steam.

Figure 2:
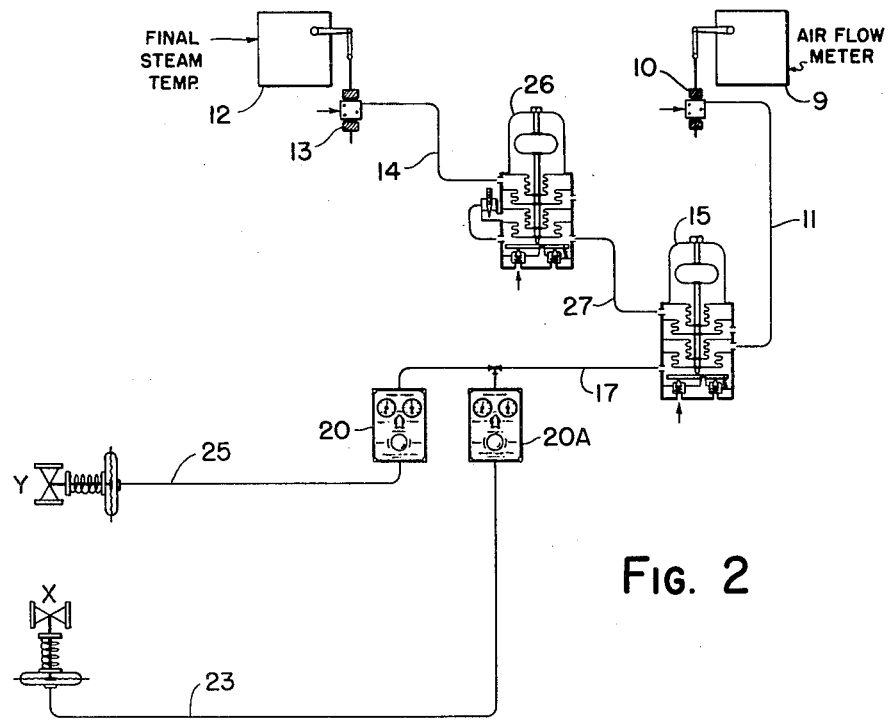
Figure 3:
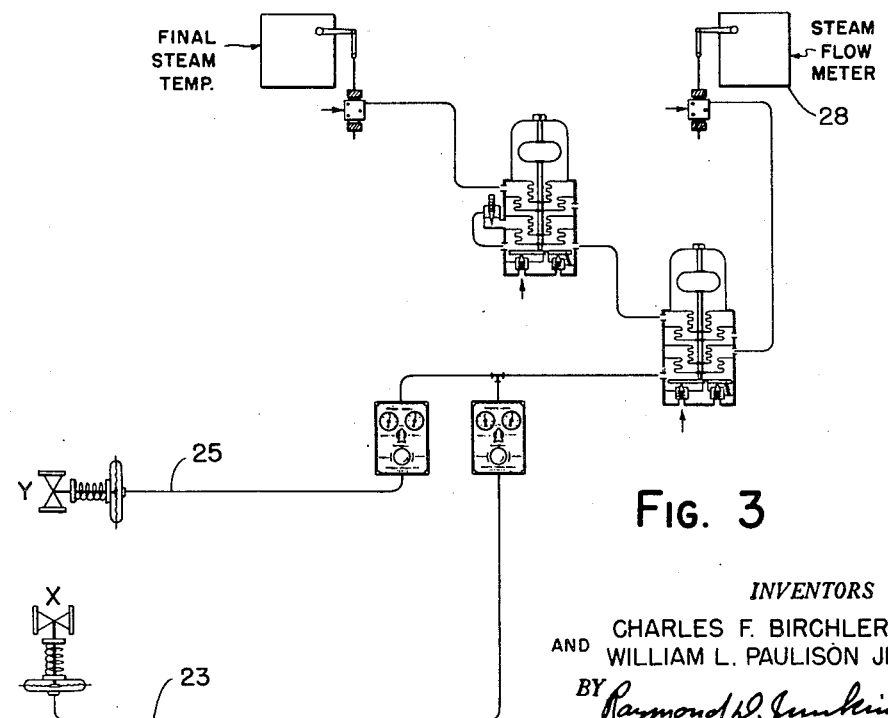

Figs. 2 and 3 each illustrate an embodiment of the control system of Fig. 1 in somewhat different apparatus.

Fig. 4 diagrammatically illustrates a second embodiment of our invention as a control system for a heat exchanger in connection with a vapor generator having a primary and a secondary superheater.

Referring now in particular to Fig. 1, we illustrate therein in somewhat diagrammatic fashion the control of cooling water supplied to a heat exchanger located in the flow path between the boiler separation drum and the superheater. We do not believe that it is necessary to complicate the drawing by illustrating the furnace and other portions of the vapor generator which do not concern themselves primarily with our invention but serve in well known manner to supply heated water and steam to a boiler separation drum 1.

The drum 1 is connected by means of a plurality of saturated steam connections 2 with a superheater inlet header 3 which takes the form of a condenser type heat exchanger. Leaving the header 3 are numerous superheater elements 4 which may later be joined in known manner by a header or headers from which the main unit discharge steam connection is taken. As diagrammatically indicated in Fig. 1 we are concerned, in the present invention, with a control of heated feed water supplied to the drum 1 and to the heat exchanger 3 and thus the drawing illustrates merely those portions of the vapor generating unit supplemented by a control system comprising our invention.

It is contemplated that the vapor generating unit of Fig. 1 is of a type having a single superheater (the elements 4) and the location of said superheater relative to the furnace or to the path of the hot gases of combustion is immaterial in the present invention but is chosen in known manner so that the necessary quantity and value of heating gases is applied to the superheater whereby, in connection with the control heat exchanger 3, the ultimate temperature of the superheated steam leaving the unit is within the desired limits. When we speak hereafter of the final steam temperature we are, of course, referring to the temperature of the superheated steam leaving the superheater and thus leaving the vapor generating unit to a point usage or demand.

In general, the control system of Fig. 1 is arranged to be responsive to a measure of demand upon the unit, with a secondary control (constituting a measure of the final temperature of the steam leaving the unit) superimposed thereupon. It is apparent that as demand upon the unit varies changes may be required in the operation of the heat exchanger 3, due to varying quantity rate of steam passing from the drum 1 and possibly a varying condition of the steam such, for example, as the temperature thereof and/or the amount of moisture carried along with the steam. Thus we provide a primary control of the heat exchanger 3 in accordance with the dictates of varying demand upon the unit, but we utilize the final temperature of the superheated steam leaving the superheater elements 4 as a check back to readjust the primary control and take into account corrections for valve characteristics and the like. The control system of our invention is in general adapted to proportion the amount of feed water going to the unit along two paths, one of which leads directly to the separation drum and the other leading to the drum 1 by way of the heat exchanger 3. It is in the control of such distribution of the feed water supply that we are primarily concerned.

Feed water is supplied to the unit through a conduit 5 branching to conduits 6 and 7. Positioned in the conduit 6 is a regulating valve X and an economizer 8. Following the economizer the conduit 6 branches to form 6, $6^1$ leading to opposite ends of the drum 1. Located in the conduit branch 7 is a regulating valve Y from which the conduit branches to opposite ends of the heat exchanger 3, passing therefrom to join the conduits 6, $6^1$ on their way to the drum 1. The control of the total rate of supply of feed water to the unit through the conduit 5 does not form a part of our present invention and is not therefore illustrated in Fig. 1. We are concerned primarily with the distribution of the water being fed through the conduit 5 and as to whether it is passed directly to the drum 1 or whether a portion of the water first goes through the heat exchanger 3.

Operation of the valves X, Y regulates the operation of the heat exchanger 3 in such a manner as to produce steam leaving the unit within the desired temperature limits. Positioning of the valves X, Y is accomplished automatically through the agency of a control system dominated by a measure of demand upon the unit and by final temperature of the steam leaving the unit.

As an indication of demand or load upon the unit we show an air flow meter 9 arranged to vertically position the movable element of an air pilot valve 10 thereby establishing in the pipe 11 an air loading pressure representative of rate of air flow through the vapor generator unit. The pilot valve 10 is preferably of the type disclosed and claimed in the patent to Johnson 2,054,464.

By "air flow" we intend to include the rate of flow of gaseous products of combustion and excess air passing through the generating unit, i. e. the assembly of vapor generator, superheater, etc. As is well known by those familiar with the art, air flow has long been utilized as an indication of firing rate or heat liberation and thereby an indication of heat available for vaporizing the liquid and superheating the vapor. On the other hand, the rate of flow of steam produced under constant conditions of temperature and pressure is a measure of heat absorption. When a vapor generator of the type being described is one of several supplying a header system, the rate of steam outflow may be a preferable guide to unit operation as an indication of load or demand upon the unit. On the other hand, when such a vapor generator supplies a single consumer such as a turbine, the demand is relatively constant and variations in firing or heat absorption of the surfaces show up as variations in temperature and pressure of the produced steam. In either case, pressure is usually the index utilized to control the supply of the elements of combustion and thereby the heat liberation, so that we may assume that steam outflow pressure is maintained substantially constant. In the present embodiment, we have preferably utilized air flow as an index of firing rate and heat availability. However, we may, under certain conditions of operation, desirably utilize steam flow as the measurable variable indicative of demand or load upon the unit as a whole.

We have illustrated at 12 a meter continuously responsive to the final temperature of the steam leaving the unit and arranged to vertically position the movable element of a pilot valve 13 to thereby establish in the pipe 14 an air loading pressure continuously representing the final temperature of the superheated steam leaving the unit.

The pipe 14 joins the A chamber of an averaging relay 15. The pipe 11 joins the C chamber of the relay 15 through an adjustable restriction 16. The B chamber is open to the atmosphere. It will thus be seen that the air loading pressures available in the pipes 11 and 14, are acting in the same direction in the establishing of a resulting loading pressure in the D chamber of the relay. From the D chamber a pipe 17 transmits the resulting loading pressure to a pair of ratio relays 18, 19. Positioned in the pipe 17 is a manual-automatic selector valve 20 which is preferably of the type disclosed in the patent of Fitch 2,202,485 providing a possibility of hand or automatic control of the valves X and Y.

Considering first the ratio relay 18, it will be observed that the loading pressure available in the pipe 17 is effective within an expansible-contractible chamber 21 for positioning the movable element of air pilot valve 22 thereby establishing an air loading pressure in the pipe 23 where it is effective in positioning the valve X. Furthermore, the air loading pressure in pipe 23 is effective within an expansible-contractible chamber 24 for opposing the chamber 21.

In similar manner, the ratio relay 19 establishes a loading pressure in the pipe 25 for positioning the valve Y.

It will be understood that the various elements of the control system just described are provided with the necessary adjustments as to starting point, range, effectiveness of operation, etc., which are usual in this type of apparatus and which, therefore, do not need to be described in detail. The adjustments allow for desirable fixed or graduated ratios between the pressures established in the pipes 23 and 25. They provide for sequential operation of the valves X and Y with adjustable overlap or paralleling in operations such as may be found necessary. In general, the operation is such that, during relatively low demand operations, the valve Y remains closed and all of the water feeding the boiler drum 1 passes through the valve X and the economizer 8. When a certain rate of output is reached the valve Y begins to open but it may open at an entirely different rate than the rate of opening of the valve X. The extent of overlap in opening of the two valves and the sequential pickup of one valve relative to the other may be adjusted.

By way of specific example it may be said that with a vapor generating unit having a maximum capacity of 675,000 lbs. of steam per hour, the following is one example of desirable operation. At an output rating of 0 to 240,000 lb. per hr. no water is passed through the valve Y. All of the water for feeding the boiler drum 1 passes through the valve X and the economizer 8. When the rating of 240,000 lb. per hr. is reached, then the valve Y begins to open but the relative rate of opening of valves X and Y is such that when a rating of 640,000 lb. per hr. is attained, the rate of water flow through the valve Y is 250,000 lb. per hr. with the remainder going through the valve X. At maximum capacity of 675,000 lb. per hr. about 300,000 lb. per hr. of water will be passed through the valve Y and the remaining 375,000 lb. per hr. will pass through the valve X. This is by way of example only and it will be undersood that the point of rating or demand at which the valve Y begins to open may be varied and also the relative rate of opening of valves X and Y.

The two element control described in connection with Fig. 1 will provide for an immediate change in flow of water to the condenser section 3 whenever the rating on the boiler changes. In other words, if the boiler is subjected to a sudden increase in load, the primary element which sets up a control loading pressure in proportion to the air flow through the boiler will immediately change the control loading pressure to the relays 18, 19 which in turn will change the control loading pressure to the control valves to proportion the water flow at approximately the correct relation in order to obtain the final desired temperature. The final steam temperature however will readjust the control loading of the valves. The main advantage of this system over a single element system operating from steam temperature alone is in the fact that the control sytstem does not wait for a change in steam temperature to be felt before changing the flow of water to the two sections, but anticipates such a change.

The anticipating control from a measure of load upon the unit might suffice alone were it not for variations in feed water header pressure, variations in feed water flow through the economizer to maintain drum level, variations in cleanliness of the boiler and superheater, etc. Thus it is desirable to have a check back from the final steam temperature measurement to readjust the primary impulse coming from a measure of load or rating.

As previously mentioned, the index of demand upon the unit as a whole may be any feasible measurement of load or output, such for example as air flow through the unit, steam flow from the unit, or the like.

In Fig. 2 we illustrate a portion of the arrangement of Fig. 1 embodying the control apparatus only and in slightly different arrangement. Here, as in Fig. 1, the loading pressure representative of demand is available through the pipe 11 to the C chamber of an averaging relay 15. A loading pressure from final steam temperature available through the pipe 14, is admitted to the A chamber of a standardizing relay 26 which is of the type disclosed and claimed in patent to Gorrie Re. 21,804 and which provides a proportional control with reset characteristics. It provides for the final control index (final steam temperature) a floating control of high sensitivity superimposed upon a positioning control of relatively low sensitivity. A function of the adjustable bleed connection in the relay 26 is to supplement the primary control of the pressure effective in pipe 27 with a secondary control of the same or of different magnitude as a follow-up or supplementary action to prevent over-travel and hunting.

The output of the relay 26, available through the pipe 27, is admitted to the A chamber of the relay 15. The output of the relay 15, as established by the demand index and the final steam temperature index, is available through the pipe 17 to a pair of manual-automatic selector valves 20, 20A separately useful in connection with the valves Y, X for submitting said valves selectively to either manual or automatic control.

The arrangement of Fig. 3 is identical with that of Fig. 2 except that herein we have illustrated a steam rate of flow meter 28 representing the load or demand index for primary control of the valves X, Y. Thus, the arrangement of Figs. 2 and 3 are specifically to two different indexes of unit load.

In Fig. 4 we illustrate an embodiment of our invention in connection with a vapor generating unit having a plurality of superheaters serially connected between the separation drum and the point of outflow from the unit. While these have been designated as a primary superheater and a secondary superheater they are preferably a radiant and a convection type. Steam leaving the drum 1 passes first through the radiant type superheater 29 located in the furnace and then enters the superheater inlet header 3 from which the steam goes into convection type superheater 30 and out into the discharge main 31.

In Fig. 1 we have indicated the heat exchanger 3 as being the superheater inlet header to which the connections 2 admit saturated steam from the boiler drum. Actually the heat exchanger 3 may be nature become a condenser so that some of the saturated steam passing thereto from the boiler drum has its moisture content increased and the steam may actually pass to the superheater elements with moisture or free entrained water therein. In Fig. 4 the heat exchanger 3 becomes more truly a desuperheater in reducing the temperature of the steam leaving the primary superheater 29 toward saturation value. It is not probable that the steam entering the heat exchanger 3 of Fig. 4 would contain entrained or free moisture or water. However, it is immaterial, insofar as our invention is concerned, whether the heat exchanger 3 of Fig. 1 is actually a steam condenser or whether in the arrangement of Fig. 4 it is a desuperheater. In either event it constitutes a heat exchanger which, when supplied with relatively cooler liquid, serves the function of reducing the temperature of the steam passed in heat conducting relation with water.

While in Fig. 4 we have indicated the superheaters 29 and 30 as being a primary superheater and a secondary superheater this is in connection with serial flow of the steam and is not to be considered as limiting. It will be understood by those familiar with the art that the primary and secondary superheaters may either one be of the radiant or convection type or either one may be subjected in part to radiant heat and in part to the heat of convection. The characteristics of the superheaters may be the same or they may differ one from the other insofar as the relation between load and steam temperature at the outlet of the superheater is concerned depending upon many factors in the design and operation of such a unit. Usually the primary superheater is so located, and is so subjected to variables in the operation of the unit, that it is more affected by slagging, soot blowing, and like conditions, and is therefore more unstable than is the secondary superheater. Thus, the temperature of the steam leaving the primary superheater 29 is more likely to vary from a fixed value, at different rates and conditions of operation, than is the temperature of the steam leaving the secondary superheater 30. On the other hand, the heat absorbing characteristics of the secondary superheater are usually more stable in nature than those of the primary superheater. While the secondary superheater will normally remain cleaner, and thus more constant in its heat absorbing capabilities, still it will be understood that if steam of widely varying temperature is admitted to the secondary superheater a certain amount of the variations would normally persist through and to the exit of the secondary superheater. For these reasons the heat exchanger 3 is preferably located between the two superheaters to smooth out as much as possible the fluctuations in steam temperature before the steam enters the secondary superheater.

In the embodiment of Fig. 4 the control of water to the heat exchanger 3 is primarily responsive to an indication of load or demand upon the unit as a whole as well as being responsive to the temperature of the steam leaving the unit and with a further tie-back from an actual measurement of the total water passing through the heat exchanger.

We show the steam flow meter 28 connected to the outflow conduit 31 across a flow nozzle 32 in known manner to be responsive to rate of flow of steam. Similarly water flow meter 33 is connected across the flow nozzle 34 positioned in the water line 7. The steam temperature meter 12 positions the movable element of the pilot valve 13 to provide in the pipe 14 an air loading pressure representative of steam temperature. The steam flow meter 28 positions the movable element of a pilot 35 to establish in the pipe 36 an air loading pressure representative of rate of steam flow through the pipe 31. The water meter 33 positions the movable element of a pilot 37 to establish in the pipe 38 an air loading pressure representative of the rate of water flow through the pipe 7 to heat exchanger 3.

The pipes 36, 38 lead to opposed pressure chambers of a comparison device 39 for positioning the movable element of a pilot 40 to establish in the pipe 41 an air loading pressure representative of interrelation between rate of steam outflow (load or demand) and rate of water flow to the heat exchanger 3. The usual adjustments are provided whereby desired ratio may be established between the flow rates so that when predetermined ratio is at hand, regardless of actual rates of flow, a predetermined loading pressure will be existent within the pipe 41 and within the B chamber of the standardizing relay 15A. The output of the relay 15A is then available in a pipe 42 for positioning the main control valves X, Y. The spring loading and other adjustabilities of the valves X, Y are so arranged that sequential and parallel positioning of the valves is accomplished in a manner somewhat similar to that described in connection with Fig. 1.

In the system of Fig. 4 the relation device 39 dictates the proportioning of water through the valves X and Y such that the rate of flow of water to the heat exchanger 3, through the flow nozzle 34, is in desired proportionality to the rate of steam outflow from the unit through the pipe 31. Thus, as demand upon the unit increases or decreases, as represented by the steam meter 28, the discrepancy in the relationship between the rate of steam outflow and the rate of water inflow will be effective upon the relay 15A to properly proportion the flow of water through the valves X, Y to return the relationship to desired value. As a final check upon the desuperheating action of the heat exchanger 3 we also impose upon the relay 15A a loading pressure through the pipe 14 representative of final steam outflow temperature. Thus a three element control is made available for proportioning the water to the unit either directly through the economizer to the drum or by way of the heat exchanger 3 to the drum.

While we have illustrated and described certain preferred embodiments of our invention, it will be understood that this is by way of example only and is not to be considered as limiting.

What we claim as new, and desire to secure by Letters Patent of the United States, is:

1. The method of controlling the final temperature of superheated steam leaving a vapor generator unit, which includes, passing steam under pressure serially from a separation drum through a first superheater contacted by heating gases then through a heat exchanger of the indirect type and finally through a second superheater contacted by heating gases, supplying heated water under elevated pressure to the unit for vaporization of the water, dividing the water supply flow so that a portion goes directly to the vapor generator while a portion goes to the vapor generator by way of the heat exchanger, measuring the rate of flow of water passed through the heat exchanger, measuring the rate of flow of steam produced by and leaving the unit, jointly utilizing said measurements to control directly the supplying of both said portions of the water and dividing of the same, measuring the final temperature of the superheated steam leaving the unit, and utilizing the temperature measurement to modify the control of water dividing.

2. The method of claim 1 wherein the measurement of rate of steam outflow is a measurement of any index of demand upon the unit as a whole.

3. In combination with a vapor generator unit having a first superheater, an indirect contact heat exchanger and a second superheater joined for serial flow of the vapor therethrough from a liquid-vapor separation zone to the point of final discharge from the unit, means for heating the superheaters, liquid supply means arranged to supply vaporizable liquid under elevated pressure to the unit, control means for the liquid supply means arranged to pass a controllable portion of the flowing liquid through the heat exchanger on its way to the vapor generating portion of the unit, said control means including a flow valve in the direct flow path to said vapor generating unit portion and another flow valve in the flow path of that portion of the liquid passing through the heat exchanger, first metering means establishing a first control effect representative of demand upon the unit, second metering means establishing a second control effect representative of rate of liquid supply passed through the heat exchanger, third metering means establishing a third control effect representative of final temperature of the vapor leaving the system, and regulating means continuously conjointly responsive to the three control effects operatively connected to each valve of the control means.

4. The combination of claim 3 wherein the three control effects are fluid control pressures.

5. The combination of claim 3 wherein the first metering means establishes a first control effect representative of rate of flow of vapor through the system.

6. The method of controlling the final temperature of superheated vapor leaving a vapor generating unit, which includes, passing the vapor under pressure serially from a separation drum through an indirect contact heat exchanger and a superheater, supplying one part of liquid to the heat exchanger for heat exchange with the vapor passing therethrough, passing said liquid from the heat exchanger to the separation drum, supplying another part of liquid directly to the separation drum, measuring the temperature of the vapor as it leaves the superheater, obtaining an index of demand for superheated vapor upon the generating unit, and jointly utilizing the measurement and the demand index to control directly the supplying of both said parts of liquid to the generating unit to proportion the percentages that go directly to the separation drum and the percentage that passes first through the heat exchanger.

7. The method of claim 6 wherein the demand index is a measurement of the rate of flow of the heating gases contacting at least a portion of the unit.

8. The method of claim 6 wherein the demand index is a measurement of the rate of flow of steam passing through the superheater.

9. In combination with a vapor generator unit having a separation drum, an indirect contact heat exchanger, and a superheater serially connected for the flow of generated vapor; liquid supply means arranged to supply vaporizable liquid under elevated pressure to the vapor generator, control means including a pair of flow valves, one of the valves in the path of flow of liquid to the vapor generating portion of the unit direct and the other valve in the path of flow of liquid to the vapor generating portion of the unit by way of the heat exchanger, a meter determining an index of load upon the unit, a meter determining the final temperature of the vapor leaving the superheater, and means operatively connecting both of said meters to each of said valves and acting conjointly to position the respective valves.

10. The combination of claim 9 including means adjustable to proportion the amount of liquid passing through the heat exchanger to the total of the liquid being supplied the vapor generating unit at different rates of unit operation.

11. The combination of claim 9 wherein the index of load is a measure of the heating gases for the vapor generator.

12. The method of controlling the final temperature of superheated vapor leaving a vapor generating unit, which includes passing the vapor under pressure serially from a separation drum through a first superheater contacted by heating gases, a heat exchanger of the indirect contact type and a second superheater contacted by heating gases, supplying one part of liquid to the heat exchanger for heat exchange with the vapor passing therethrough, passing said liquid from the heat exchanger to the separation drum, supplying another part of liquid directly to the separation drum, measuring the temperature of the vapor as it leaves the second superheater, obtaining an index of demand for superheated vapor upon the generating unit, measuring the rate of flow of liquid passing through the heat exchanger, and jointly utilizing said measurements and demand index to control directly the supplying of both said parts of liquid to the generating unit to proportion the percentages that go directly to the separation drum and the percentage that passes first through the heat exchanger.

13. The method of claim 12 in which the superheated vapor is steam, all the liquid water passed to the separation drum is heated and under elevated pressure, and the index of demand for superheated steam is the rate of steam outflow from the vapor generating unit.

14. In combination with a vapor generator unit having a first superheater, an indirect contact heat exchanger and a second superheater joined for serial flow of the vapor therethrough from a liquid-vapor separation zone to the point of final discharge from the unit, means for heating the superheaters, liquid supply means arranged to supply vaporizable liquid under elevated pressure to the unit, control means for the liquid supply means arranged to pass a controllable portion of the flowing liquid through the heat exchanger on its way to the vapor generating portion of the unit, said control means including a flow valve in the direct flow path to said vapor generating portion and another flow valve in the flow path of that portion of the liquid passing through the heat exchanger, a meter determining an index of load upon the unit, a meter of the liquid passed through the heat exchanger, comparison means for said meters, a meter of the final temperature of the vapor leaving the unit, and means conjointly responsive to said comparison means and the said temperature meter adapted to regulate the control means through said valves.

CHARLES F. BIRCHLER.
WILLIAM L. PAULISON, Jr.

REFERENCES CITED

The following references are of record in the file of this patent:

UNITED STATES PATENTS

| Number | Name | Date |
| --- | --- | --- |
| 2,319,223 | Frisch | May 18, 1943 |
| 2,421,761 | Rowand et al. | June 10, 1947 |

FOREIGN PATENTS

| Number | Country | Date |
| --- | --- | --- |
| 394,417 | Great Britain | June 29, 1933 |
| 399,937 | Great Britain | Oct. 19, 1933 |
| 515,067 | Great Britain | Nov. 24, 1939 |